United States Patent
Berdichevski et al.

(10) Patent No.: US 9,756,078 B2
(45) Date of Patent: Sep. 5, 2017

(54) PROACTIVE INTERNET CONNECTIVITY PROBE GENERATOR

(71) Applicant: General Electric Company, Schenectady, NY (US)

(72) Inventors: Igor Berdichevski, Herzliya (IL); Lior Ateret, Herzliya (IL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 504 days.

(21) Appl. No.: 14/339,748

(22) Filed: Jul. 24, 2014

(65) Prior Publication Data

US 2016/0028601 A1 Jan. 28, 2016

(51) Int. Cl.
*G06F 15/173* (2006.01)
*H04L 29/06* (2006.01)
*H04L 29/08* (2006.01)

(52) U.S. Cl.
CPC .......... *H04L 63/20* (2013.01); *H04L 63/0428* (2013.01); *H04L 63/0209* (2013.01); *H04L 63/16* (2013.01); *H04L 63/166* (2013.01); *H04L 69/321* (2013.01)

(58) Field of Classification Search
CPC . H04L 63/20; H04L 63/0209; H04L 63/0428; H04L 63/16; H04L 63/116; H04L 69/321
USPC .......... 709/220–222, 223–224; 713/151–152
See application file for complete search history.

(56) References Cited

U.S. PATENT DOCUMENTS

| | | | |
|---|---|---|---|
| 7,092,986 B2 * | 8/2006 | Wang | H04L 69/161 709/224 |
| 7,346,922 B2 * | 3/2008 | Miliefsky | H04L 63/0272 726/11 |
| 7,398,307 B2 * | 7/2008 | Dorland | H04L 41/08 709/223 |
| 8,365,018 B2 | 1/2013 | McIntosh et al. | |
| 8,488,627 B2 * | 7/2013 | Hunter | H04L 69/32 370/469 |

(Continued)

FOREIGN PATENT DOCUMENTS

WO 2012/164336 A1 12/2012

OTHER PUBLICATIONS

Holstein, Dennis K. et al., "Cyber Security management for Utility Operations", Proceedings of the 39th Hawaii International Conference on System Sciences, Jan. 4-7, 2006, vol. 10, (pp. 1-10, total 10 pages).

(Continued)

*Primary Examiner* — Bharat N Barot
(74) *Attorney, Agent, or Firm* — Buckley, Maschoff & Talwalkar LLC

(57) ABSTRACT

Described herein are reception of first processor-executable program code and a configuration file specifying a target internet protocol address, an asset-identifying information type, and a security protocol, and execution of the received first processor-executable program code to identify a first one or more network communication interfaces of the first computing system, generate a message including information conforming to the asset-identifying information type, the information identifying a first asset, secure the message based on the security protocol, and transmit the secure message to the target internet protocol address via each of the first one or more network communication interfaces.

20 Claims, 8 Drawing Sheets

(56) References Cited

U.S. PATENT DOCUMENTS

| | | |
|---|---|---|
| 8,595,831 B2 | 11/2013 | Skare |
| 8,689,107 B2 * | 4/2014 | Dong .................... H04L 43/045 |
| | | 715/734 |
| 8,949,382 B2 * | 2/2015 | Cornett ............... H04L 41/0806 |
| | | 709/220 |
| 2005/0076201 A1 * | 4/2005 | Thornton ............ H04L 63/0823 |
| | | 713/156 |
| 2005/0132225 A1 | 6/2005 | Gearhart |
| 2007/0101121 A1 * | 5/2007 | Henry ................. H04L 63/0869 |
| | | 713/151 |
| 2010/0153156 A1 | 6/2010 | Guinta et al. |
| 2010/0153544 A1 * | 6/2010 | Krassner ............. G06F 17/2247 |
| | | 709/224 |
| 2012/0284790 A1 | 11/2012 | Bhargava |
| 2013/0086635 A1 | 4/2013 | Hershey et al. |
| 2013/0086685 A1 | 4/2013 | Haynes |
| 2016/0164956 A1 * | 6/2016 | Hopen ................ H04L 67/1008 |
| | | 709/208 |

OTHER PUBLICATIONS

Jie, Peng et al., "Industrial Control System Security", 2011 Third International Conference on Intelligent Human-Machine Systems and Cybernetics (IHMSC), IEEE, DOI: 10.1109/IHMSC.2011.108, (pp. 156-158, 3 pages total).

* cited by examiner

PROACTIVE INTERNET CONNECTIVITY
PROBE GENERATOR

BACKGROUND

The phrase "Industrial Internet" has arisen as conventional industrial equipment becomes increasingly network-connected. Examples of such equipment include, but are not limited to, medical equipment, aviation units, trains, gas turbines and any sensors thereof. Network connections were initially used to remotely control and/or collect data from the equipment, but are now used to diagnose problems, provide software updates, and/or integrate the equipment into cloud architectures (e.g., to store data from their sensors and apply analytics thereto).

Best practices typically require isolation between equipment (generally referred to herein as "assets") and the public Internet. Absent this isolation, the assets are susceptible to cyber-attacks which may result in theft of private data, theft of intellectual property, asset malfunctions, etc. However, due to system error, human error, or sabotage, hardware assets may become connected to the public Internet.

SUMMARY

Some embodiments provide reception of first processor-executable program code and a configuration file. The configuration file specifies a target internet protocol address, an asset-identifying information type, and a security protocol. Also provided are execution of the received first processor-executable program code to identify a first one or more network communication interfaces of the first computing system, generation of a message including information conforming to the asset-identifying information type, the information identifying a first asset, securing of the message based on the security protocol, and transmission of the secure message to the target internet protocol address via each of the first one or more network communication interfaces.

Some embodiments may further include reception of the secure message at the target internet protocol address at a second computing system, unsecuring, at the second computing system, of the secure message based on the security protocol to generate the message; and determination, at the second computing system, the first asset based on the information identifying the first asset in the message.

Some embodiments may also or alternatively include generation, at a third computing system, of the configuration file specifying the target internet protocol address, the asset-identifying information type, and the security protocol; and transmission of the configuration file from a network communication interface of the third computing system to the first computing system, wherein the first computing system and the third computing system are within a same demilitarized computing network.

BRIEF DESCRIPTION OF THE DRAWINGS

The construction and usage of embodiments will become readily apparent from consideration of the following specification as illustrated in the accompanying drawings, in which like reference numerals designate like parts, and wherein.

DESCRIPTION

The following description is provided to enable any person in the art to make and use the described embodiments. Various modifications, however, will remain readily apparent to those in the art.

Figure 1:
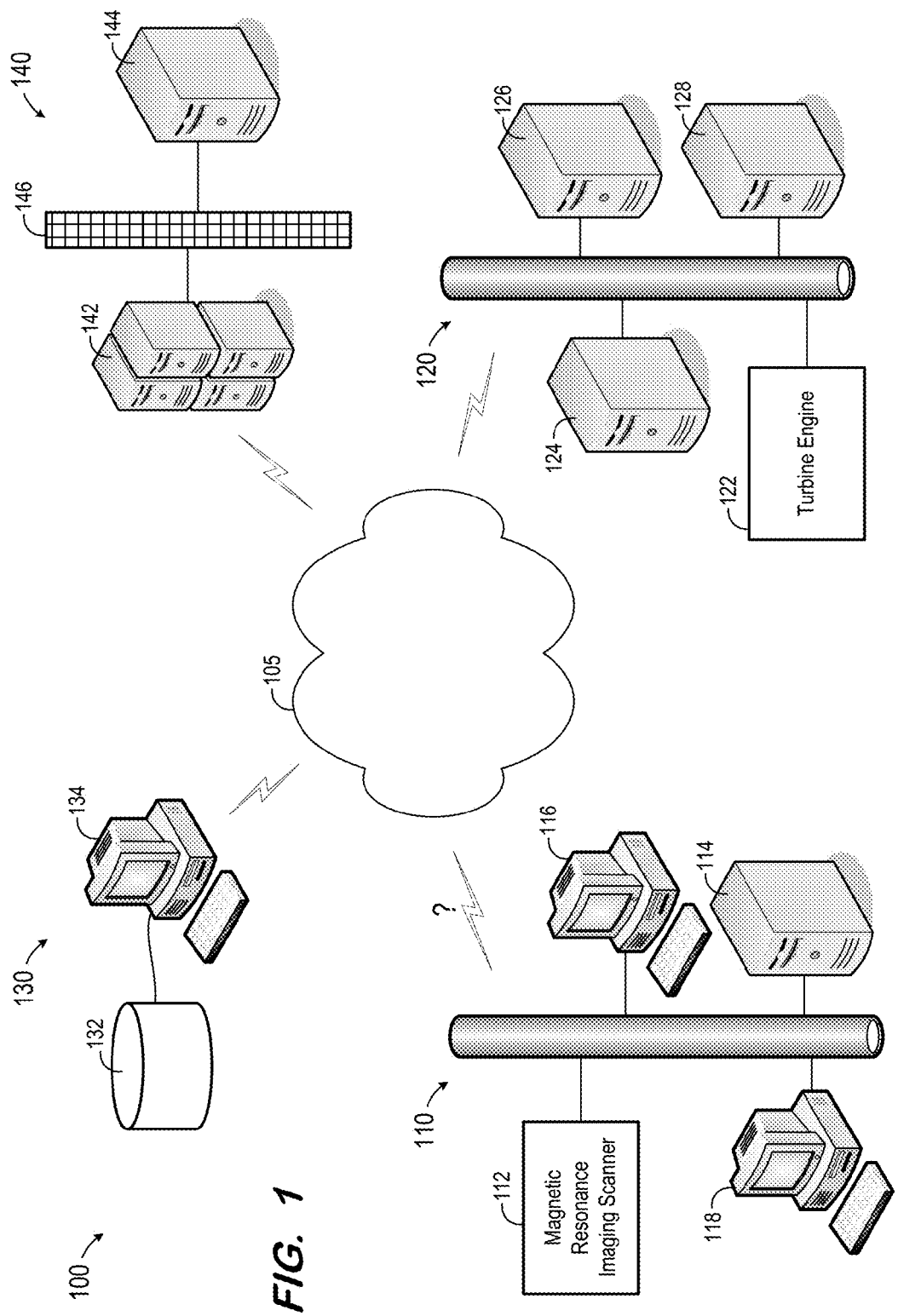
FIG. 1 illustrates an example architecture according to some embodiments.

FIG. 1 illustrates system architecture 100 within which some embodiments may be implemented. Although some devices of architecture 100 are depicted as communicating via dedicated connections, it should be understood that all illustrated devices may communicate to one or more other illustrated devices through any number of other public and/or private networks, including but not limited to Internet 105. Two or more of the illustrated devices may be located remote from one another and may communicate with one another (and with other non-illustrated elements) via any known manner of network(s) and/or a dedicated connection. Moreover, each device may comprise any number of hardware and/or software elements suitable to provide the functions described herein as well as any other functions. Other topologies may be used in conjunction with other embodiments.

According to the example of FIG. 1, systems 110, 120, 130 and 140 are each connected, in one manner or another, to Internet 105. System 110 comprises a computing network for supporting magnetic resonance imaging (MRI) scanner 112. According to the example, system 110 also comprises server 114 and terminals 116 and 118. Embodiments may include any number of type of computing devices and/or hardware assets that are or become known.

System 120 also comprises a computing network. System 120 includes turbine engine 122 and servers 124, 126 and 128. Although systems 110 and 120 are each illustrated as including a single asset, either or both systems may comprise other assets, including multiple ones of a same type of asset (e.g., multiple MRI scanners or multiple turbine engines).

System 130 comprises computer terminal 134, such as a desktop computer, and data storage device 132, such as a relational database system. System 140 comprises application servers 142 and server 144, separated by firewall 146.

A brief description of operation according to some embodiments will now follow with respect to system 100. Embodiments are not limited to the following description.

Initially, system 130 generates a configuration file which specifies a target Internet Protocol (IP) address, an asset-identifying information type and a security protocol. For example, terminal 134 may retrieve the configuration file from data storage device 132 based on the hardware asset to be protected.

According to the present example, the target IP address is associated with server 142, the operation of which will be described below. The asset-identifying information type describes one or more types of information which may be used to identify a particular asset, such as, but not limited to, a serial number. The security protocol specifies a protocol used to secure a message, such as public key encryption or the like.

System 130 then securely provides the configuration file to hardware proximate to MRI scanner 112. This hardware may comprise terminal 116 of system 110, which is a workstation used to operate MRI scanner 112. In this regard, systems 110 and 130 may be located within a same demilitarized zone (DMZ), and/or communications therebetween may be otherwise secured via a security protocol that is or becomes known. System 130 also securely provides executable code to terminal 116 along with the configuration file. One or more processors of terminal 116 may execute the code to cause terminal 116 to perform the actions described below.

Upon executing the code, terminal 116 identifies available network interfaces. These network interfaces include those interface located on terminal 116 as well as any other network interfaces of system 110. Identification of the network interfaces may comprise probing Transmission Control Protocol (TCP), User Datagram Protocol (UDP) and Internet Control Message Protocol (ICMP) communication layers.

Terminal 116 then generates a message based on the target IP address and on the asset-identifying information type specified in the received configuration file. The message may, for example, include a serial number of MRI scanner 112. Terminal 116 secures the message using the security protocol specified in the configuration file, and transmits the secure message via the identified network interfaces.

Hopefully, the secure message never reaches server 142 because system 110 is not connected to Internet 105. However, if so, server 142 receives the message and removes security from the message (e.g., decrypts the message) based on the security protocol. Server 142 may be previously-aware of the security protocol specified in the configuration file.

Server 142 transmits the unsecured message to server 144 through firewall 146. Server 144 determines the asset identified in the message based on the asset-identifying information (i.e., the serial number) and initiates any currently or hereafter-known security measures to protect the network-exposed asset.

Embodiments are not limited to the foregoing example, and other details according to some embodiments are presented below.

Figure 2:
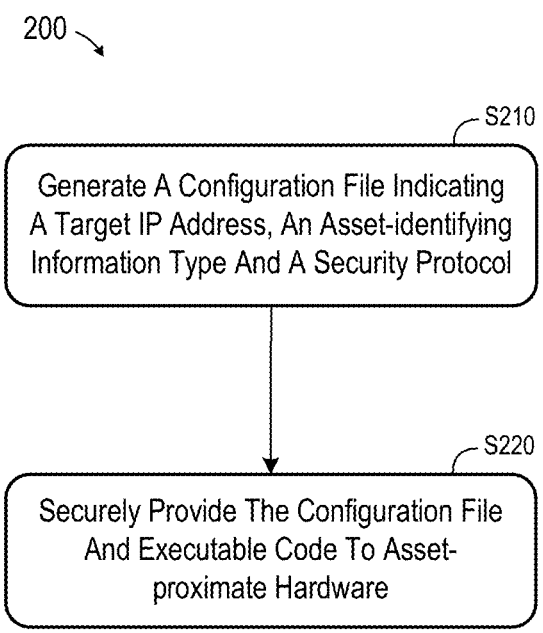
FIG. 2 is a flow diagram of a process according to some embodiments.

FIG. 2 is a flow diagram of process 200 according to some embodiments. Process 200 and the other processes described herein may be performed using any suitable combination of hardware or software. Software embodying these processes may be embodied in processor-executable code and stored by any non-transitory tangible medium, including a fixed disk, a floppy disk, a CD, a DVD, a Flash drive, or a magnetic tape. The code may be executed by one or more processing units of a computing device, including a processor, processor cores, execution threads, or the like.

Initially, a configuration file is generated at S210. The configuration file specifies a target IP address, an asset-identifying information type and a security protocol. The target IP address is associated with a server which is configured to receive and process messages as described below. The asset-identifying information type indicates one or more types of information which may be used to identify a particular asset. This information type may comprise a serial number, a name, a network address, GPS coordinates, a business department, an administrator ID, and/or any other type of information which may be used to identify an asset.

In a case that the specified security protocol is public key encryption, the configuration file may include a public key. This public key may be symmetric to a private key of the server associated with the target IP address. The configuration file may specify any security protocol that is or becomes known, and may specify more than one security protocol.

Figure 3:
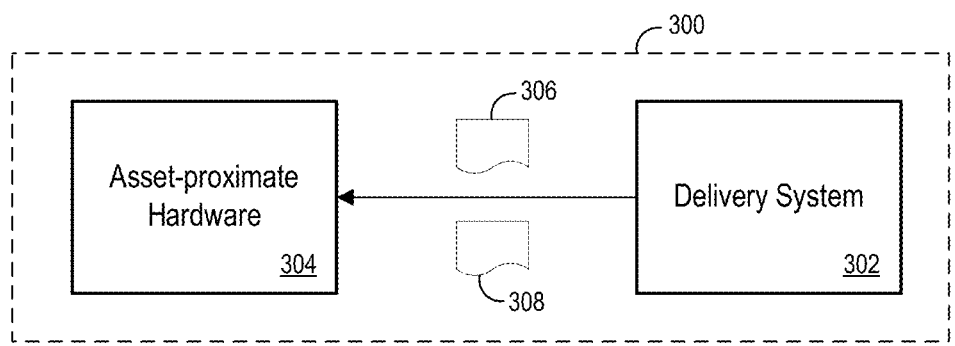
FIG. 3 is a block diagram illustrating a process according to some embodiments.

Next, at S220, the configuration file and executable code are securely provided to hardware which is proximate to the asset of interest. FIG. 3 is a block diagram illustrating S220 according to some embodiments. As shown, delivery system 302 provides configuration file 306 and executable code 308 to asset-proximate hardware 304. Delivery system 302 may comprise any computing device or system that is or becomes known. Asset-proximate hardware 304 may comprise any computing device or system capable of executing executable code 308, and which is connected, directly and/or via a local network, to one or more assets.

Environment 300 represents a secure environment through which configuration file 306 and executable code 308 are provided. Environment 300 may comprise a DMZ, a secure networked connection (e.g., an encrypted "tunnel"), or may simply consist of a direct connection between delivery system 302 and asset-proximate hardware 304. In the latter case, delivery system 302 may comprise a portable computing device which is brought into proximity of hardware 304 and connected directly thereto. According to some embodiments, the configuration file and/or the executable code are encrypted. Moreover, the executable code may be protected via code obfuscation.

According to some embodiments, S220 comprises loading a readable storage device into a corresponding interface of asset-proximate hardware 304. More specifically, S220 may comprise placing a portable flash memory into a reader of asset-proximate hardware and instructing hardware 304 to read configuration file 306 and executable code 308 therefrom.

S220 may comprise providing a configuration file and executable code to many different asset-proximate hardware systems. With reference to FIG. 1, terminal 134 may securely provide, at S220, a same configuration file and executable code to server 124 associated with turbine engine 122, and to terminal 116 associated with MRI scanner 112.

Figure 4:
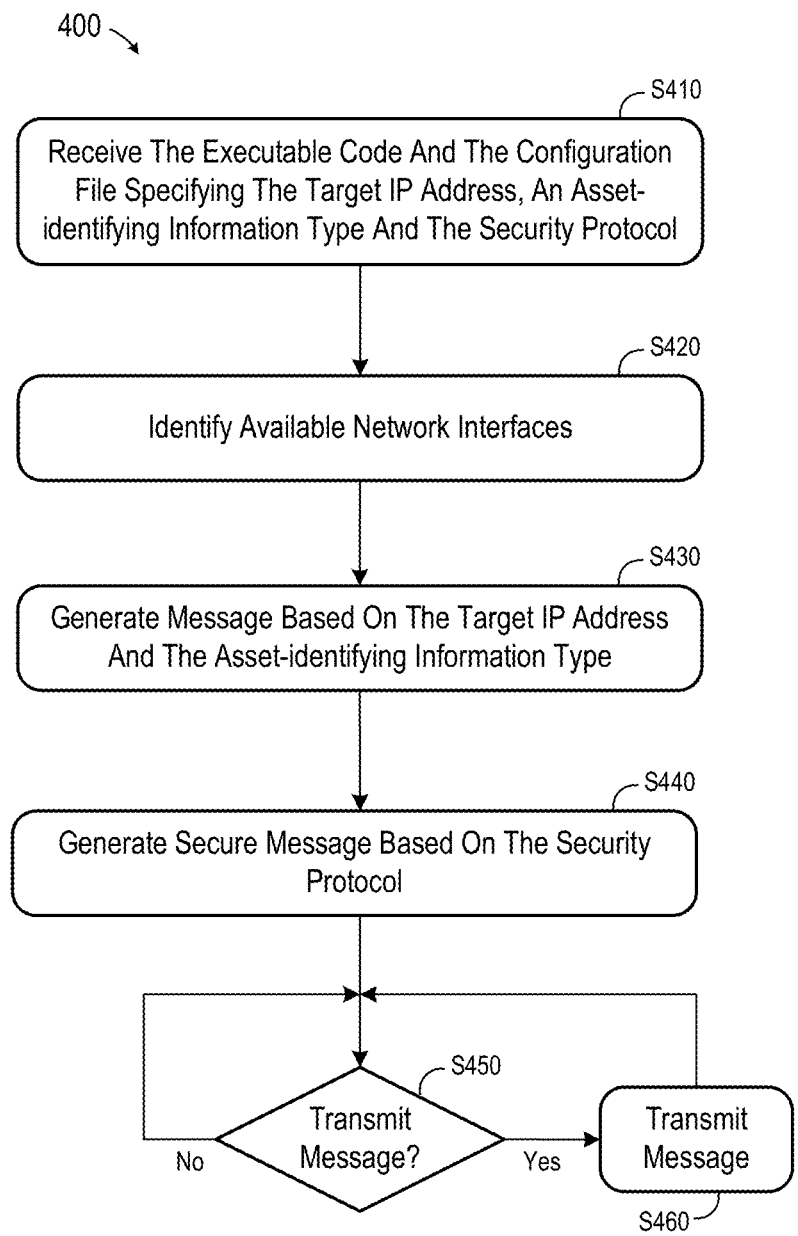
FIG. 4 is a flow diagram of a process according to some embodiments.

Process 400 of FIG. 4 may be performed by asset-proximate hardware as described herein. Accordingly, the executable code and the configuration file are received at S410. As mentioned above, the configuration file specifies a target IP address, an asset-identifying information type and a security protocol.

The asset-proximate hardware then executes the executable code, either automatically or under the control of an administrator. Execution of the code causes the hardware to identify available network interfaces at S420. Identification of available network interfaces at S420 is intended to probe for any possible path to the Internet from the asset-proximate hardware and, by extension from the asset of interest.

Possible communication layers to probe include Transmission Control Protocol (TCP), User Datagram Protocol (UDP) and Internet Control Message Protocol (ICMP) layers, but are not limited thereto. According to some embodiments, S420 includes determining the network location of the asset-proximate hardware (e.g., using a tool such as traceroute).

Next, at S430, execution of the code causes the hardware to generate a message based on the target IP address and on the asset-identifying information type specified in the received configuration file. The message may, for example, include a serial number of MRI scanner 112. The message may also include the network location, if determined as mentioned above, so that an access route from the asset to the Internet (if any) may be determined therefrom. The message is then secured at S440 using the security protocol specified in the configuration file (e.g., encryption via public key, encryption unique asynchronous key, password-protection).

According to some embodiments, S450 comprises determining whether to transmit the secure message. This determination may be time-based. For example, S450 may comprise determining whether a specified time period has elapsed since a last message was transmitted. If so, the message is transmitted at S460. In some embodiments, a network comprises several asset-proximate hardware devices executing the executable code. The specified time period mentioned above may therefore be randomized, in order to reduce the possibility of simultaneous message transmission by multiple asset-proximate hardware devices.

In another example, S450 also or alternatively comprises determining whether the current time is during a specified window (e.g., after working hours, while the network load is presumed to be low).

The determination of whether or not to transmit a message may also or alternatively be based on load awareness. In one example, S450 comprises acquiring a performance metric from the asset-proximate hardware, such as network load, and evaluating the metric against a threshold. If performance is low, flow may pause at S450 until performance exceeds a requirement. Moreover, in some embodiments, if a time since a last message was transmitted at S460 is greater than a specified maximum time, flow may proceed from S450 to S460 regardless of the value of the performance metric.

In response to an affirmative determination at S450, the message is transmitted at S460. Flow then returns to S450 to await a next determination to transmit the message.

According to some embodiments, the message is transmitted at S460 through all 65535 ports. In order to reduce network load, some embodiments comprise transmission of the message through a pre-designated subset of commonly-used ports, such as HTTP, HTTPS, FTP, DNS, Net BIOS, Share, etc. In other embodiments, transmission of the message at S460 includes determining the ports which are in use by the asset-proximate hardware (e.g., using a netstat command) and transmitting the secure message through these ports. Embodiments may implement source hiding/packet spoofing, in which different packets of the transmitted message appear to originate from different sources.

According to some embodiments, execution of the executable code causes execution of a watchdog service which monitors for tampering of process 400, to ensure that process 400 remains running.

Figure 5:
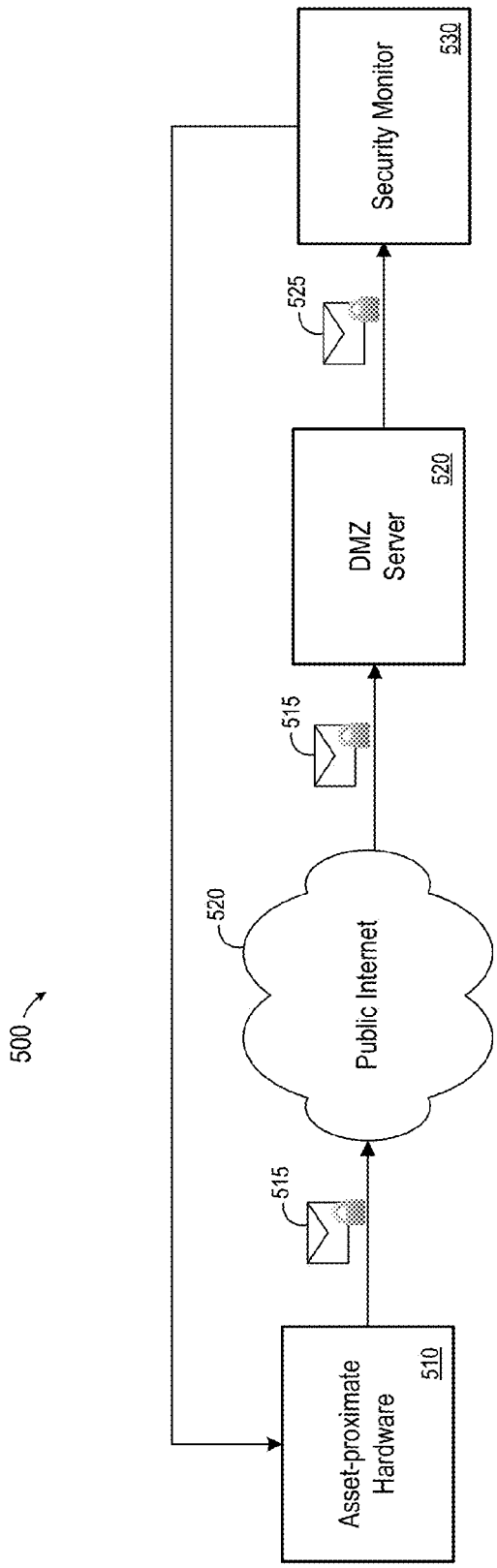
FIG. 5 is a block diagram illustrating a process according to some embodiments.
Figure 6:
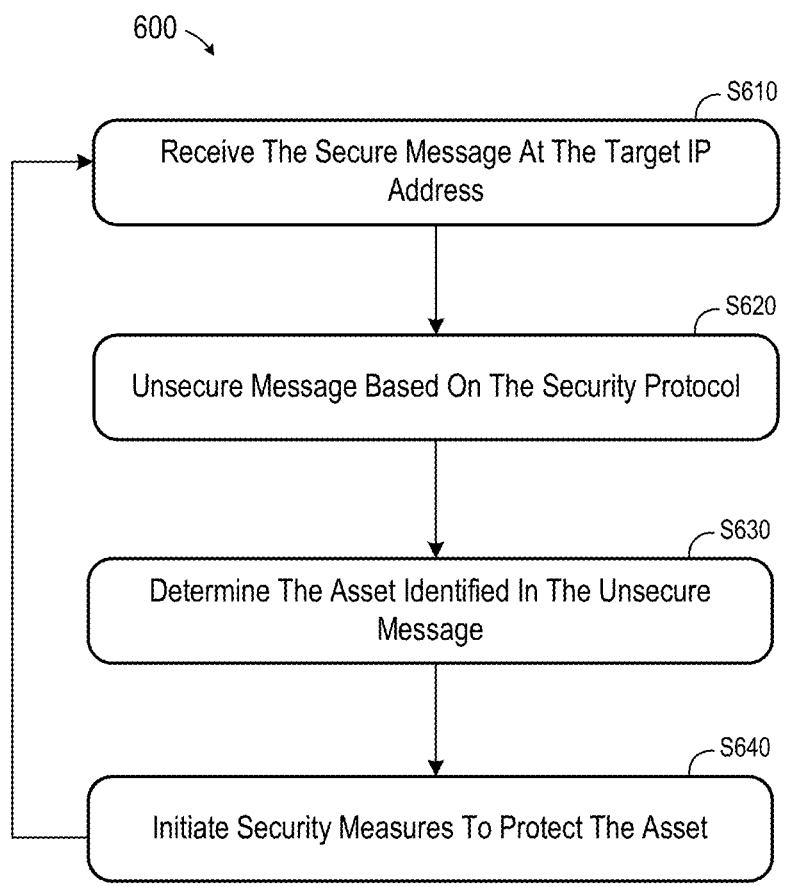
FIG. 6 is a flow diagram of a process according to some embodiments.

FIG. 5 illustrates system 500 according to some embodiments. As described with respect to S460, asset-proximate hardware 510 transmits secure message 515. In the illustrated case, message 515 is transmitted via a network interface and through a port which is in communication with Internet 520. Secure message 515 is associated with a target IP address of DMZ server 520 and is therefore delivered thereto by Internet 520.

Process 600 may be executed by DMZ server 520 and security monitor 530 according to some embodiments. DMZ server 520 and security monitor 530 may each comprise any type of computing system. As described with respect to system 140 of FIG. 1, DMZ server 520 and security monitor 530 may be separated by a firewall, with both the firewall and DMZ server 520 configured to shield security monitor 530 from Internet 520.

At S610, the secure message is received at the target IP address. The target IP address was specified in the above-described configuration file and corresponds to a server which is configured to receive and process such secure messages, such as DMZ server 520. According to some embodiments, the unsecure message is then passed from the server associated with the target IP address to a secured server, such as security monitor 530.

Security monitor 530 may comprise, in some embodiments, a log server and a Security Information and Event Manager (SIEM) unit. The log server may unsecure the secure message at S620 based on the security protocol specified in the configuration file, and pass the unsecure message to the SIEM unit. "Unsecuring" the secure message may comprise decryption, removing password-protection, or any other mechanism for removing message security.

The SIEM unit reads the message and, at S630, determines the asset identified in the unsecure message. The asset is determined based on the asset-identifying information specified in the message. Upon determining the Internet-exposed asset, the SIEM unit initiates security measures to protect the asset at S640. The security measures may include any one or more of the following: transmitting a message to the asset-proximate hardware from which the message was received; transmitting a message to an administrator; shutting down the asset; shutting down the network on which the asset resides; and any other measure.

Figure 7:
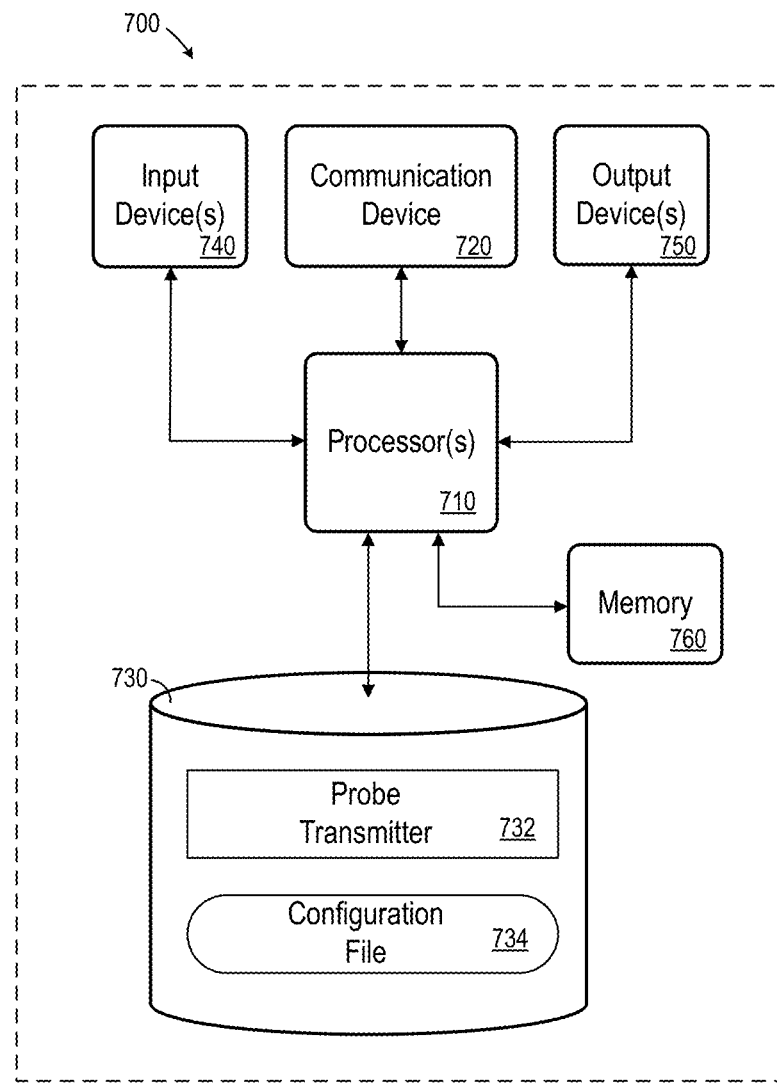
FIG. 7 is a block diagram of a system according to some embodiments.

FIG. 7 is a block diagram of general-purpose or dedicated computing device 700 according to some embodiments. Computing device 700 may comprise a general-purpose computing apparatus and may execute program code to perform any of the functions described above. Computing device 700 may, for example, comprise asset-proximate hardware as described herein.

Computing device 700 includes processor(s) 710 (e.g., processor cores and/or processing threads) configured to execute processor-executable program code to cause device 700 to operate as described herein, data storage device 730, one or more input devices 740, one or more output devices 750 and memory 760. Communication device 720 may facilitate communication with external devices, such as a network interface. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Probe transmitter 732 may comprise executable code to cause device 700 to execute process 400 as described herein. Embodiments are not limited to execution of process 400 by a single apparatus. Configuration file 734 may comprise a configuration file including a target IP address, a security protocol and an asset-identifying information type. Data storage device 730 may also store data and other program code for providing additional functionality and/or which are necessary for operation of device 700, such as device drivers, operating system files, etc.

Figure 8:
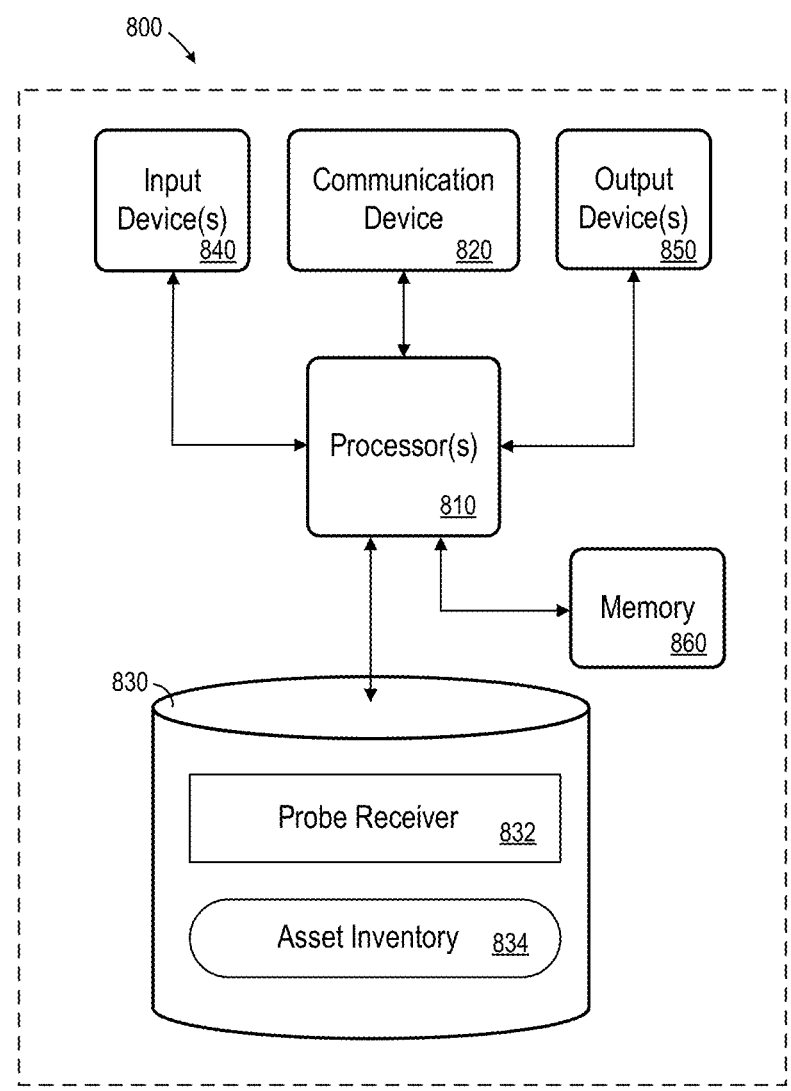
FIG. 8 is a block diagram of a system according to some embodiments.

FIG. 8 is a block diagram of general-purpose or dedicated computing device 700 according to some embodiments. Computing device 800 may comprise a general-purpose computing apparatus and may execute program code to perform process 600 as described above. Computing device 800 may, for example, comprise security monitor 530 in some embodiments.

Computing device 800 includes processor(s) 810, communication device 820, data storage device 830, one or more input devices 840, one or more output devices 850 and memory 860, each of which may be implemented as described with respect to similarly-named elements of computing device 700.

Probe receiver 832 may comprise executable code to cause device 800 to execute process 600 as described herein. As mentioned in the foregoing description of FIG. 5, embodiments are not limited to execution of process 600 by a single apparatus. Asset inventory 834 is a data file including information for identifying an asset based on information received within a message as described herein. For example, asset inventory 834 may associate asset serial numbers with an asset type, asset location, security level, owner, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may include any number of hardware and/or software elements suitable to provide the functions described herein as well as any other functions. For example, any computing device used in an implementation of some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A system comprising:
  a first computing device comprising:
    a first one or more network communication interfaces associated with a network protocol comprising one or more transmission layers; and
    a first processor to execute processor-executable program code in order to cause the first computing device to:
      receive (1) first processor-executable program code and (2) a configuration file specifying (i) a target internet protocol address, (ii) an asset-identifying information type to identify a particular hardware machine, and (iii) a security protocol for transmission over the one or more transmission layers, the security protocol comprising public key encryption via a public key, a unique asynchronous key, or password-protection wherein in a case that the security protocol is public key encryption, the configuration file comprises the public key; and
    execute the received first processor-executable program code to:
      identify the first one or more network communication interfaces by probing the one or more transmission layers;
      generate a message including information conforming to the asset-identifying information type, the information identifying a first asset;
      secure the message based on the security protocol; and
      transmit the secure message to the target internet protocol address via each of the first one or more network communication interfaces.

2. A system according to claim 1, further comprising:
  a second computing device comprising:
    a second network communication interface; and
    a second processor to execute processor-executable program code in order to cause the second computing device to:
      generate the configuration file specifying the target internet protocol address, the asset-identifying information type, and the security protocol; and
      transmit the configuration file from the second network communication interface to the first computing device,
      wherein the first computing device and the second computing device are within a same demilitarized computing network.

3. A system according to claim 2, wherein the second processor is further to execute the processor-executable program code in order to cause the second computing device to transmit the first processor-executable program code to the first computing device.

4. A system according to claim 1, further comprising:
  a second computing device comprising:
    a second network communication interface; and
    a second processor to execute processor-executable program code in order to cause the second computing device to:
      receive the secure message at the target internet protocol address;
      unsecure the secure message based on the security protocol to generate the message; and
      determine the first asset based on the information identifying the first asset in the message.

5. A system according to claim 4, the second processor to further execute processor-executable program code in order to cause the second computing device to:
  in response to the determination of the first asset, execute security measures to protect the first asset.

6. A system according to claim 4, further comprising:
  a third computing device comprising:
    a third network communication interface; and
    a third processor to execute processor-executable program code in order to cause the third computing device to:
      generate the configuration file specifying the target internet protocol address, the asset-identifying information type, and the security protocol; and transmit the configuration file from the third network communication interface to the first computing device, wherein the first computing device and the third computing device are within a same demilitarized computing network.

7. A system according to claim 1, wherein the asset-identifying information type comprises a hardware serial number.

8. A non-transitory computer-readable medium storing program code, the program code executable by a processor of a first computing system to cause the first computing system to:

receive (1) first processor-executable program code and (2) a configuration file specifying (i) a target internet protocol address, (ii) an asset-identifying information type, and (iii) a security protocol for transmission over one or more transmission layers associated with a network protocol, the security protocol comprising public key encryption via a public key, a unique asynchronous key, or password-protection wherein in a case that the security protocol is public key encryption, the configuration file comprises the public key; and execute the received first processor-executable program code to:

identify a first one or more network communication interfaces of the first computing system by probing the one or more transmission layers;

generate a message including information conforming to the asset-identifying information type, the information identifying a first asset;

secure the message based on the security protocol; and transmit the secure message to the target internet protocol address via each of the first one or more network communication interfaces.

9. A non-transitory computer-readable medium according to claim 8, the program code executable by a processor of a second computing system to cause the second computing system to:

generate the configuration file specifying the target internet protocol address, the asset-identifying information type, and the security protocol; and transmit the configuration file from the second network communication interface to the first computing system, wherein the first computing system and the second computing system are within a same demilitarized computing network.

10. A system according to claim 9, the program code executable by the processor of the second computing system to cause the second computing system to transmit the first processor-executable program code to the first computing system.

11. A non-transitory computer-readable medium according to claim 8, the program code executable by a processor of a second computing system to cause the second computing system to:

receive the secure message at the target internet protocol address;

unsecure the secure message based on the security protocol to generate the message; and determine the first asset based on the information identifying the first asset in the message.

12. A system according to claim 11, the program code executable by the processor of the second computing system to cause the second computing system to, in response to the determination of the first asset, execute security measures to protect the first asset.

13. A non-transitory computer-readable medium according to claim 11, the program code executable by a processor of a third computing system to cause the third computing system to:

generate the configuration file specifying the target internet protocol address, the asset-identifying information type, and the security protocol; and transmit the configuration file from a network communication interface of the third computing system to the first computing system, wherein the first computing system and the third computing system are within a same demilitarized computing network.

14. A non-transitory computer-readable medium according to claim 8, wherein the asset-identifying information type comprises a hardware serial number.

15. A computer-implemented method comprising:

receiving, at a first computing system, (1) first processor-executable program code and (2) a configuration file specifying (i) a target internet protocol address, (ii) an asset-identifying information type, and (iii) a security protocol for transmission over one or more transmission layers associated with a network protocol, the security protocol comprising public key encryption via a public key, a unique asynchronous key, or password-protection wherein in a case that the security protocol is public key encryption, the configuration file comprises the public key;

executing the received first processor-executable program code at the first computing system to:

identify a first one or more network communication interfaces of the first computing system by probing the one or more transmission layers;

generate a message including information conforming to the asset-identifying information type, the information identifying a first asset;

secure the message based on the security protocol; and transmit the secure message to the target internet protocol address via each of the first one or more network communication interfaces.

16. A computer-implemented method according to claim 15, further comprising:

generating, at a second computing system, the configuration file specifying the target internet protocol address, the asset-identifying information type, and the security protocol; and transmitting the configuration file from a second network communication interface of the second computing system to the first computing system, wherein the first computing system and the second computing system are within a same demilitarized computing network.

17. A computer-implemented method according to claim 15, further comprising:

transmitting the first processor-executable program code from the second computing system to the first computing system.

18. A computer-implemented method according to claim 15, further comprising:

receiving the secure message at the target internet protocol address at a second computing system;

unsecuring, at the second computing system, the secure message based on the security protocol to generate the message; and determining, at the second computing system, the first asset based on the information identifying the first asset in the message.

19. A computer-implemented method according to claim 18, further comprising:
in response to the determination of the first asset, executing security measures to protect the first asset.

20. A computer-implemented method according to claim 18, further comprising:
generating, at a third computing system, the configuration file specifying the target internet protocol address, the asset-identifying information type, and the security protocol; and
transmitting the configuration file from a network communication interface of the third computing system to the first computing system,
wherein the first computing system and the third computing system are within a same demilitarized computing network.

* * * * *